J. MAILLET.
AGRICULTURAL MACHINE.
APPLICATION FILED JUNE 4, 1915.

1,284,121.

Patented Nov. 5, 1918.
3 SHEETS—SHEET 1.

J. Maillet.
Inventor:
By Glesdon Marks
Attorney.

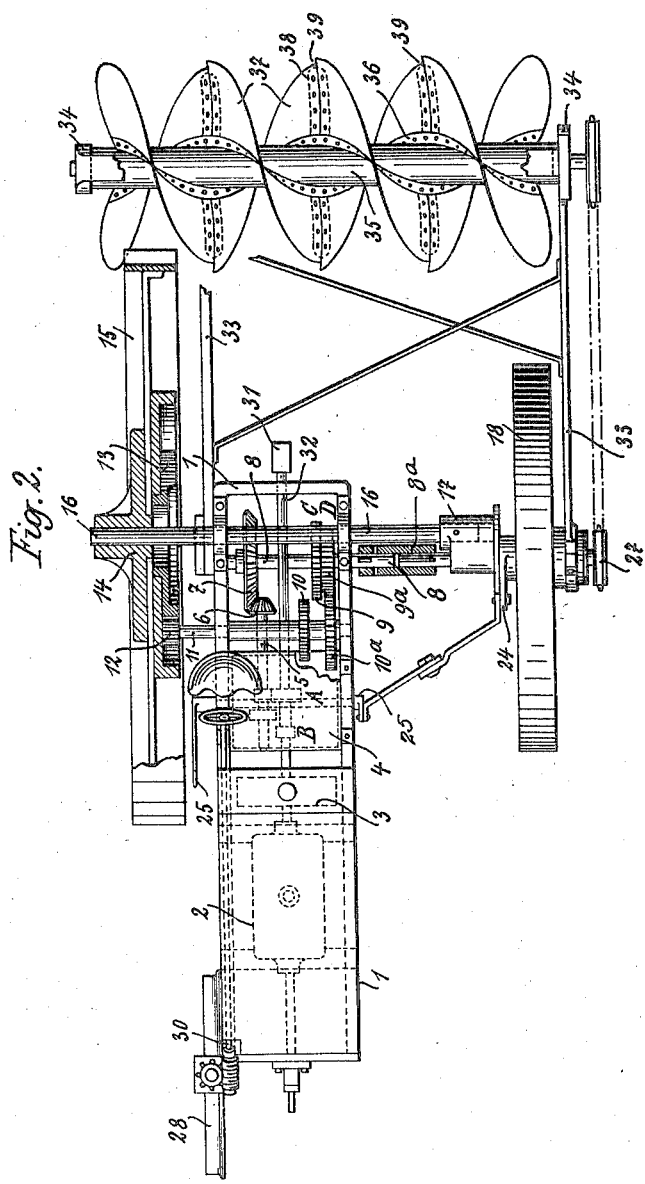

J. MAILLET.
AGRICULTURAL MACHINE.
APPLICATION FILED JUNE 4, 1915.
1,284,121.
Patented Nov. 5, 1918.
3 SHEETS—SHEET 3.
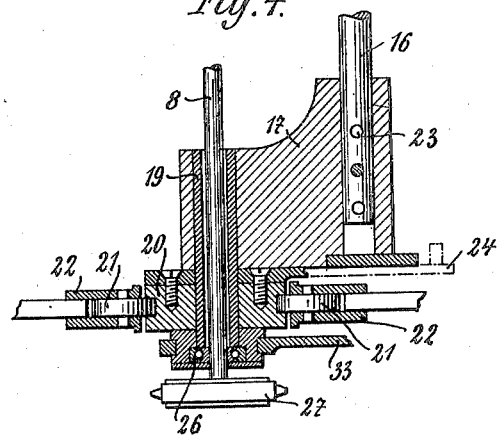
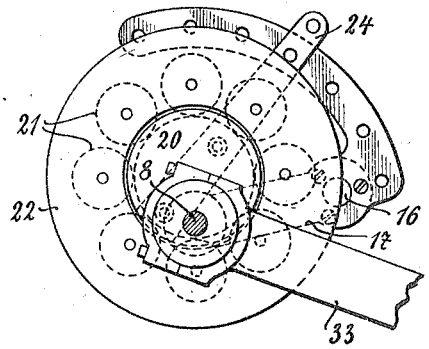
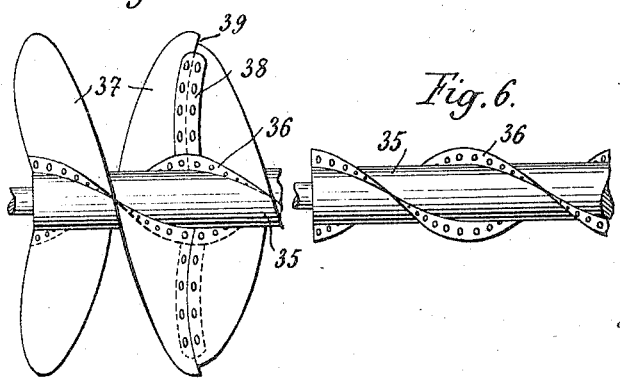
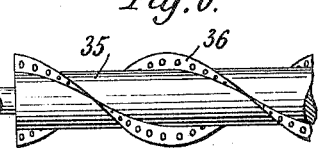
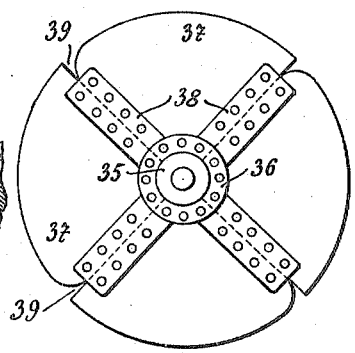
J. Maillet.
Inventor:
By [signature]
Attorney.

UNITED STATES PATENT OFFICE.

JOANNY MAILLET, OF LAIZ PRES PONT-DE-VEYLE, FRANCE.

AGRICULTURAL MACHINE.

1,284,121.

Specification of Letters Patent.

Patented Nov. 5, 1918.

Application filed June 4, 1915. Serial No. 32,100.

*To all whom it may concern:*

Be it known that I, JOANNY MAILLET, a citizen of the French Republic, and residing at Laiz pres Pont-de-Veyle, in the Department of Ain, France, have invented certain new and useful Improvements in Agricultural Machines, of which the following is a specification.

This invention relates to agricultural machines.

A large number of motor driven agricultural machines have been proposed with mechanically driven rotary plows. Such plows have usually consisted of drums furnished with variously shaped tools such as disks, claws, picks, cutters, blades, etc. All those plows are intended to work a given condition of soil in such a manner as to produce a characteristic structure or "granulation" determined by the particular shape of the tools used. For altering the size of the granulation according to the composition of the soils to be lightened or the nature of the crops to be cultivated, two means have hitherto been employed. The first consists in varying the distance of the tools from one another along their shaft and the other consists in varying the speed of rotation. The first means is not suitable for all cases; even when the tools have been constructed to allow of their being spaced farther apart it is usually tedious and laborious and often cannot be accomplished by one man alone. The other means which consists in varying the speed of rotation would be more practical if the speed of rotation could be varied infinitely. Now unless the speed-changing mechanism is rendered extremely complicated (a condition which is prohibitive in the construction of agricultural machinery) it is scarcely practicable to provide more than two or three changes which is wholly inadequate in most cases.

It is one of the objects of the present invention to provide means for combining the speed of rotation of the plowing apparatus with the speed of travel of the motor vehicle carrying the said apparatus. In this manner it is then possible to obtain, as regards the range or path of the tools, a kinematic variation that is infinitely greater than in the known machines and therefore to produce a variety of granulation ranging from a large clod to fine powder according to the different nature of the soil or the kind of crops to be cultivated.

To this end the motor driven apparatus that carries the tools is provided with a double speed-changing mechanism which can be operated by the driver by means of a set of levers or pedals which enable him to adapt instantly the operation of the entire machine to the particular kind of work to be done.

It is another object of the present invention to provide improved and novel mechanical devices that increase the efficiency of the machine and render the control thereof more easy.

It is another object of the present invention to provide improved tools for the plowing apparatus that facilitate the construction and mounting thereof.

The accompanying drawings illustrate by way of example two embodiments of this invention:

Fig. 2 is a plan of the machine shown in Fig. 1;

Fig. 3 is a side view of a bracket connection between the shaft of the main wheel and the hub of the opposite wheel;

Fig. 4 is a sectional plan thereof showing part of the power transmission device for the rotary plow;

Fig. 5 is a side elevation of a portion of the rotary plow;

Fig. 6 is a side elevation of a portion of the plow shaft with the blades removed;

Fig. 7 is a view of the rotary plow taken at right angles to Fig. 5 showing the means for connecting the blades and the shape of the blades.

Figure 1:
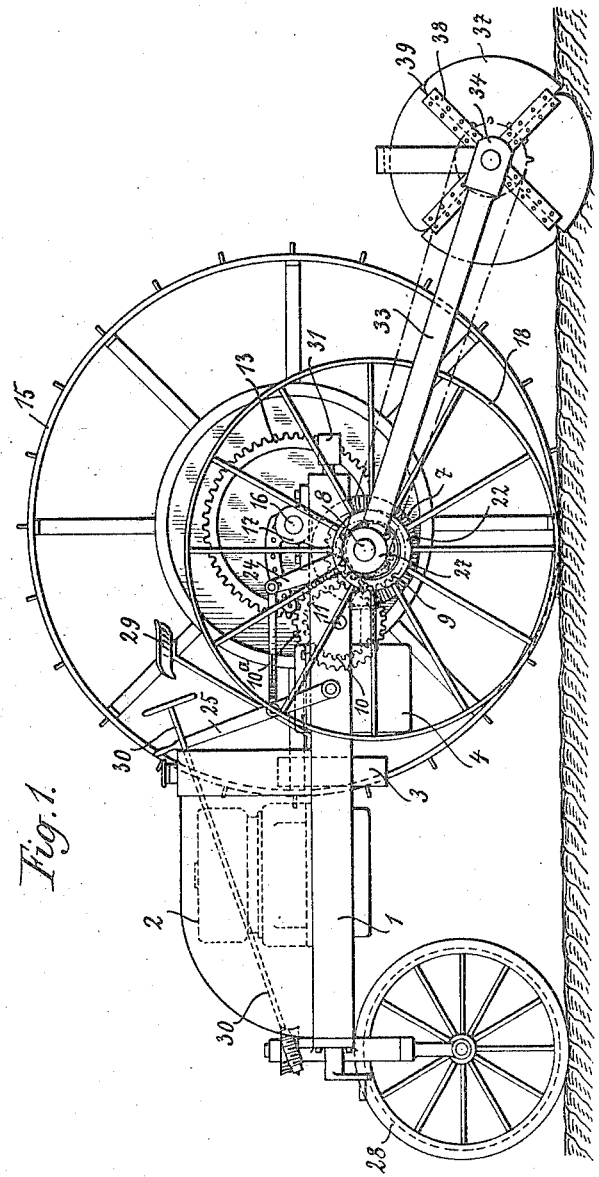
Figure 1 is a side elevation of a motor vehicle wherein the plowing apparatus consists of a screw having a plurality of threads located with its axis at right angles to the direction of movement.

The machine shown in Figs. 1 and 2 consists essentially of a motor vehicle carrying the tools and of a plowing or tilling apparatus proper.

The tool-carrying vehicle comprises a narrow carriage 1 carrying the motor 2 and clutch device 3. This vehicle may, after removal of the tilling apparatus, be employed for many purposes such as a tractor, a road locomotive, or as a motor vehicle carrying tools for various purposes. 4 is a casing inclosing a first-speed change gear with reverse driving mechanism.

In Fig. 2 the gear wheels (shown in dotted lines) allow of two different speeds according to whether the gears are engaged at A or B. From this speed change gear there extends rearwardly a driving shaft 5 having a fast bevel pinion 6 that engages with the bevel wheel 7 fast on the cross shaft 8. This shaft also carries the two pinions 9 and 9ª adapted to engage alternatively the wheels 10 and 10ª which permit a change of speed of the counter-shaft 11 according as they are engaged at C or at D.

The control of both these speed change gears is effected by any suitable means.

The shaft 11 carries on its other end a fast pinion 12 engaging the toothed gear 13 mounted fast on the hub 14 of the driving wheel 15 which latter is of comparatively large diameter. When the machine is used for drawing a plow the driving wheel runs in the open furrow that has been formed by the previous passage of the machine and since its tread is then furnished with spikes or bars these penetrate into the sub-soil which gives a firmer hold than the overlying layer of arable soil. Moreover, the spikes or bars effect the breaking up of the top crust of the sub-soil layer that is formed by the frequent passage of cultivating implements.

As shown in Fig. 2 the axis of the hub 14 of the driving wheel is offset from the axis of the shaft 8 to permit of the power for driving the plow being transmitted through the axis of the opposite wheel 18. The inner end of the axle 16 carries a bracket 17 that serves as a bearing for the journal 19 of the supporting wheel 18. This wheel is mounted as follows: Revolubly mounted on the bracket 17 is a disk 20 arranged eccentrically to the journal member 19. This disk 20 has a peripheral race for the rollers 21 on which the hub 22 of the wheel 18 turns. The bracket 17 is adapted to be shifted along the axle 16 and fixed to the latter by means of bolts extending through one or other of a choice of holes 23 so that the gage of the machine may be altered to suit requirements. By operating the lever 24 (Fig. 3) rigidly fastened to the disk 20 and connected to the hand lever 25 (Fig. 1) the height of the carrying wheel relatively to the machine can be varied and the machine can be kept level in all circumstances of use. As best shown in Fig. 2 the axle 8 has an extensible joint 8ª and the link connecting the levers 24 and 25 is extensible to permit the lateral adjustments of the wheel 18. The journal 19 is hollow and is traversed by the revoluble shaft 8 journaled in the ball bearing 26 fixed to the journal 19. The end of the shaft 8 carries a sprocket wheel 27 that drives the rotary plow or tilling apparatus by means of a chain as hereinafter described. 28 is a steering wheel operated by means of the hand wheel 30 by the driver from the seat 29. The steering wheel rotates in approximately the same plane as the driving wheel so that the machine is adapted to turn in a very short radius backward and forward and can thus execute every kind of agricultural work. 31 is a driving pulley to which other machines can be coupled. It is keyed on a driving shaft 32.

The tilling apparatus proper is pivoted to the carriage on the axis of the shaft 8 by means of two arms 33. It can be raised and lowered by any suitable means (not shown). The two arms 33 are provided at their outer ends with bearings 34 in which an axle 35 revolves. The axle receives its motion through a chain on the pinion 27. The axle 35 consists of a cast metal core with threads 36 (Fig. 6) some centimeters in height upon which are mounted the working screw threads 37 which constitute the tools proper. To facilitate mounting these threads are built up of helicoidal sections connected together by means of plates 38, all the parts being fixed by means of bolts or rivets. The outer edges of the screw threads are so shaped as to form saw teeth as shown at 39 in order to prevent grass and straw from getting between the sections. The soil is cut up by the outer edges of the threads the peripheral speed of which is greater than that of the driving wheel of the tool-carrying section of the vehicle. The strips of soil that are cut are turned over by the concave surfaces of the threads in combination with the suitable ratio between the speed of rotation of the tools and the speed of advance of the machine. When the operator alters this ratio the working is altered correspondingly. The first speed change gear which is inclosed in the gear case 4 acts at the same time upon the speed of rotation of the apparatus as a whole relatively to the speed of the motor. The second speed change gear consisting of the gears 9, 10 and 9ª, 10ª, modifies the speed ratio between the driving wheel and the tilling implement or rotary plow.

If as shown in the drawing, each speed change gear has two speeds, then, for instance, the following ratios can be obtained between the speed of advance and the speed of rotation of the tools:—

| On engaging— | Advance. | Tools. |
|---|---|---|
| A with C | 30 meters | 90 revs. |
| A with D | 40 meters | 90 revs. |
| B with C | 41 meters | 130 revs. |
| B with D | 55 meters | 130 revs. |

This represents a working which varies from a thin slice to a wide strip, or in other terms from fine pulverization to very coarse granulation.

Having now described my invention what I claim as new and desire to secure by Letters Patent is:—

1. An agricultural machine comprising a motor, a power driven rotary tilling implement mounted on a transverse shaft, a counter-shaft, a change speed gear transmission between the motor and the counter-shaft, a second change speed gear between the counter-shaft and a driving wheel of the vehicle and a direct drive transmission between the counter-shaft and the rotary tilling implement.

2. An agricultural machine comprising a motor, a power driven rotary tilling implement mounted on a shaft, a counter-shaft extending through the hub of one of the supporting wheels, a change speed gear between the motor and the counter-shaft, a second change speed gear between the counter-shaft and a driving wheel of the vehicle and a direct drive between the counter shaft and the rotary tilling implement.

3. In an agricultural machine having a rotary tilling implement and a motor which operates both as a tractor and an actuator for the tilling implement, a change speed mechanism, in which a change of gear simultaneously alters both the speed of travel and the speed of rotation of the tilling implement relatively to the speed of the motor, and an independent change speed mechanism which alters the speed of travel of the machine in its direction of movement.

4. An agricultural machine comprising a motor driven vehicle mounted upon a leading wheel and a pair of rear wheels one of which latter is a driving and the other of which is a supporting wheel, a tilling implement connected to the vehicle, change speed power transmission mechanism for driving the vehicle and change speed power transmission mechanism acting through the hub of the supporting wheel for operating the tilling implement.

In testimony whereof I have signed my name to this specification in the presence of two subscribing witnesses.

JOANNY MAILLET.

Witnesses:
L. CHARMETTE,
T. PÉRIGNY.

Copies of this patent may be obtained for five cents each, by addressing the "Commissioner of Patents, Washington, D. C."